UNITED STATES PATENT OFFICE 2,067,906

MANUFACTURE OF PIGMENTS

Henry Dourif, Huntington, W. Va.

No Drawing. Application August 15, 1934,
Serial No. 740,003

1 Claim. (Cl. 134—39)

My invention relates broadly to the manufacture of pigments for use in paints and printing inks and more particularly to a process for treating a water pulp pigment for flushing into a vehicle used in paint and printing ink manufacture.

One of the objects of my invention is to provide a process of treating water pulp pigments for flushing into paint or printing ink vehicles in a manner which is substantially complete and thorough as to the elimination of water.

Another object of my invention is to provide a process of treating a water pulp pigment in a way which will not necessitate the use of heat which is, in many cases, detrimental to the quality of the color of the resulting pigment.

Still another object of my invention is to provide a process of treating a water pulp pigment for flushing into selected vehicles without resorting to the use of any chemical products.

A further object of my invention is to provide a process of treating a water pulp pigment which comprises freezing the water pulp, thawing the frozen water pulp, eliminating the free water therefrom, and flushing out the remaining water.

A still further object of my invention is to provide a process for treating a water pulp pigment which has been mixed with a vehicle which consists in first introducing an artificial freezing condition, thereafter thawing the frozen water pulp, and thereafter eliminating the free water while retaining the pigment and vehicle.

Another object of my invention is to provide a process of flushing a water pulp pigment into a vehicle which comprises solidifying the water pulp mixing the solidified pulp with a vehicle and subsequently liquefying the solidified water pulp in the vehicle and centrifugally separating the water from the pigment and vehicle.

Other and further objects of my invention reside in the process of manufacturing sensitive or delicate pigments, flushed into a vehicle, as set forth more fully in the specification hereinafter following:

Colored inorganic or organic pigments, dyestuffs, lakes, used in the manufacture of paints and printing inks are, for the most part, obtained at a certain stage of their fabrication in the form of very fine, sometimes colloidal, particles dispersed in a large mass of water. To separate the pigment from the greatest possible amount of water, a filter press or a centrifuge is used in which the solid product is retained in the form of a more or less stiff paste containing from 30 to 85% of adsorbed and free water, constituting a water pulp.

One phase of paint or printing ink manufacture is to disperse the pigment in a suitable vehicle containing a large proportion of vegetable or mineral oils or varnishes, a mixture of these eliminating the water. To this end, the water pulp may be dried, then powdered, then ground in the chosen vehicle. Or the water pulp may be mixed with the chosen vehicle and the water be caused to separate from the mixture, leaving the pigment incorporated in the vehicle. This last operation constitutes the flushing process. It has the advantage of eliminating drying and pulverizing, besides giving an easier and better dispersion of the pigment in the vehicle for those colors which have a tendency to agglomerate in drying.

Some water pulps are easily flushed by mere mechanical processes. I name in this class blanc fixe, aluminum hydrate, chrome yellows, zinc yellows, the tanning lakes of methyl violet, a great many lakes with blanc fixe and aluminum hydroxide base, paranitraniline red; but other water pulps have been found very reluctant to shed their water and many processes have been evolved to facilitate this operation, involving heat, vacuum, displacement of the water by solvents, toluene distillation, or the use of soap, linoleates, and various chemical products. All these processes are to some extent objectionable, the addition of chemicals carefully chosen to modify the surface tension and ease flushing usually leaves undesirable impurities or foreign matter in the finished product and the processes involving heat are detrimental to many heat sensitive pigments.

With these objections in mind, I set out to evolve a new process of flushing that would not in any way make use of heat or chemicals. I believe that most of the water in the water pulp is adsorbed and tied to the color particles by great surface tension forces, as shown by the application to such water pulp of tremendous hydraulic press pressures which remove only that small fraction of the water present that I term the free water. These surface tension forces vary with each individual pigment, its molecular nature and its particle size, hence the variable difficulty experienced in flushing.

I have discovered that these surface tension forces binding water to solid particles can be better annulled by a physical process, involving crystallization forces through a freezing of the water pulp and subsequent thawing. By submitting the water pulp to temperatures below 0 degrees Centigrade, the adsorbed water, as well as the free water, will form ice crystals and the solid water no longer adheres uniformly or strongly to the pigment particles. The surface tension forces present in the original water pulp binding the adsorbed water to the pigment (the existence of which is responsible for flushing difficulties) have been annulled definitely. At this point, thawing the frozen pulp, at room temperature, for instance, will liberate all the previously adsorbed water and the free water in the form of free water easy to expel.

In the case of pigments difficult to flush, such as alkali blue, Victoria blue permanent lake, and most of the phospho-tungstic and molybdic acid lakes, I proceed as follows:

After having obtained a frozen pulp, I allow it to thaw at room temperature, then expel most of the released water through centrifuging, then add the chosen vehicle to the pulp and, using any standard dough mixer, I mechanically flush out the remaining water. The resulting dispersion of the pigment in the chosen vehicle which is obtained by this process is of better quality and of greater coloring power than could have been obtained by any other process now known to the art. In the case of pigments still more difficult to flush, such as the iron blues, I proceed as follows:

1st. Freezing of the water pulp.

2nd. Shaving of the frozen pulp through an ice shaving machine.

3rd. Receiving the "snow" so produced in a chilled vehicle contained in a jacketed dough mixer with blades revolving until a homogeneous magma is obtained.

4th. Raising the temperature in the mixer until the ice crystals melt.

5th. Dumping the separated water.

6th. Dumping the mixture of pigment-vehicle.

7th. Running the mixture over a three roll mill to expel the remaining occluded water.

The carrying out of the process of my invention is accomplished with standard ice, paint and printing ink machinery throughout.

I have found the process of my invention highly practical and successful and, while I have described my invention in one of its preferred embodiments, I desire that it be understood that modifications may be made and that no limitations upon my invention are intended other than are imposed by the scope of the appended claim.

What I claim as new and desire to secure by Letters Patent of the United States, is as follows:

In the manufacture of pigment products, the process of freeing the pigment from suspension in a water pulp which comprises freezing the water pulp, shaving the frozen water pulp to produce a snow-like mass, receiving the snow-like mass in a chilled vehicle, agitating the mixture of chilled vehicle and snow-like mass and simultaneously raising the temperature of the mixture to the melting point of water, whereby the pigment is flushed into the vehicle, and eliminating the freed water from the mixture of pigment and vehicle.

HENRY DOURIF.